Figure 1:
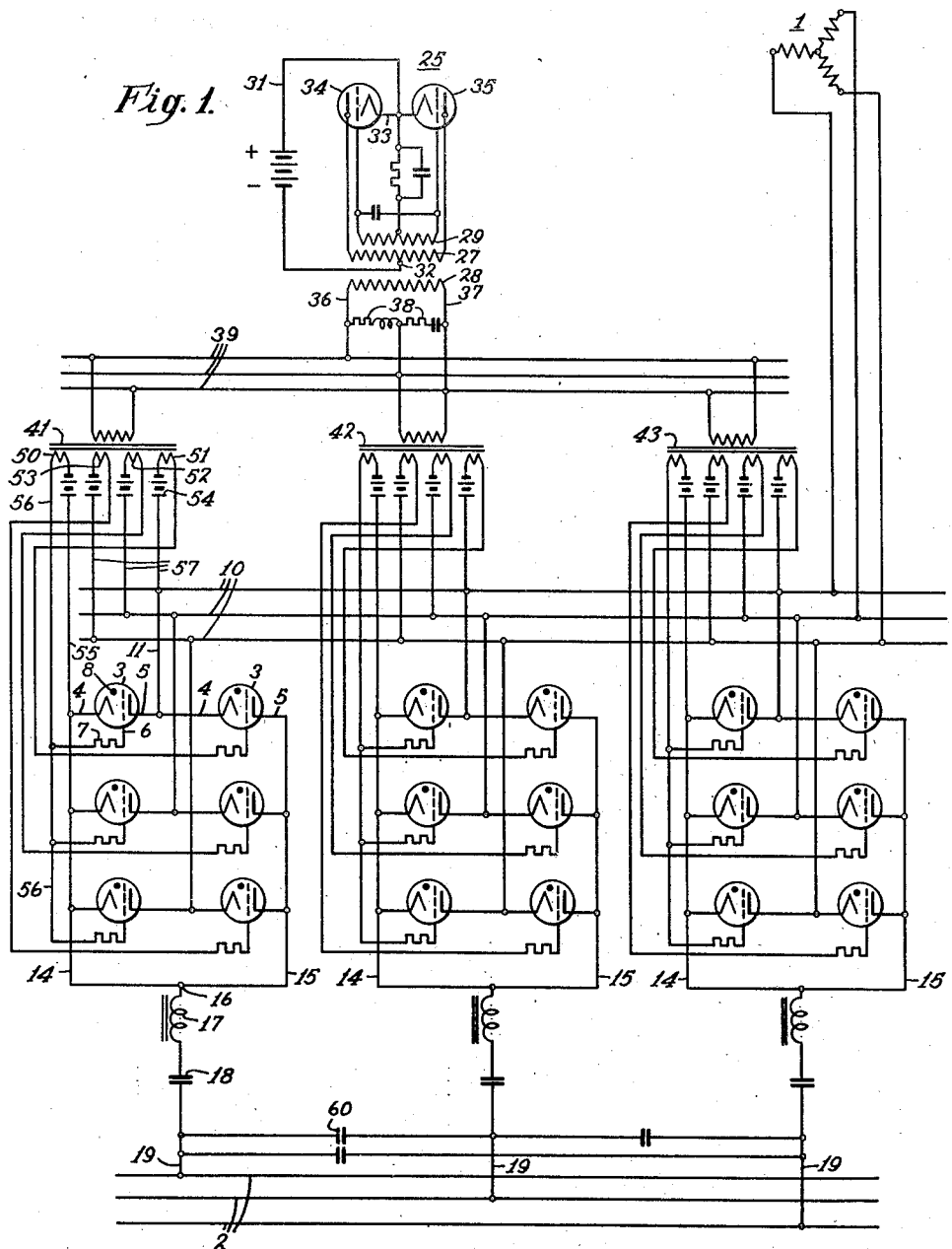

May 25, 1948.    J. L. BOYER    2,442,257
ELECTRONIC CONVERTER
Filed Dec. 14, 1946    2 Sheets-Sheet 1

WITNESSES:
Edward Michaels
Wm. L. Groome

INVENTOR
John L. Boyer.
BY O. B. Buchanan
ATTORNEY

Patented May 25, 1948

2,442,257

UNITED STATES PATENT OFFICE 2,442,257

ELECTRONIC CONVERTER

John L. Boyer, Wilkinsburg, Pa., assignor to Westinghouse Electric Corporation, East Pittsburgh, Pa., a corporation of Pennsylvania Application December 14, 1946, Serial No. 716,195

5 Claims. (Cl. 172—281)

My invention relates to electronic power-conversion equipment for directly converting from alternating current of one frequency, or even from direct current, to alternating current of a different frequency, which may be either higher or lower than the input-frequency. Although not limited to any particular application, my invention is particularly applicable to the difficult case in which an electronic converter or inverter-system is called upon to supply alternating-current energy to a dead load, without the use of rotating equipment to establish the voltage and the frequency of the load-system.

An important field of application of my invention is on large aircraft, where it is desirable to have an electronic frequency-converter interposed between a generator and an auxiliary load-circuit, of 400 cycles or any other desired frequency, for supplying power to auxiliary equipment on the aircraft. The generator is commonly driven by connection to one of the main motors or prime movers of the aircraft, and it is subject to speed-variations which often make its frequency vary from 300 cycles to 900 cycles, more or less. It is desirable to have the load-circuit operate at a constant frequency, which is independent of the generator-frequency, and it is also desirable to have any short-circuits, which occur in the wiring on the aircraft, to burn clear, so that the possibility of a complete loss of auxiliary power is reduced.

An object of my present invention is to provide a frequency-changer or converter which is not sensitive to overloads, and which, on the contrary, is able to supply very heavy overloads, and to continue to operate under short-circuit conditions. The circuit is arranged to give the power-tubes more time for deionization, as the load-current is increased.

A more specific object of my invention is to provide an alternating-current electronic converter-system in which two groups of tubes are provided for each output-conductor, with control so that only one tube-group for each output-conductor is firing at the same time, the two groups firing on alternate half-cycles of the output-frequency, with series commutating-capacitors for making the converter self-excited, by commutating the current from one tube to the opposite tube, that is, from one tube-group to the other tube-group for each output-conductor. The series commutating-capacitors normally provide an ample deionization-time, by interrupting the current-flow in one tube-group before the firing of the tube-group of opposite polarity during the next half-cycle of the output-frequency, and this deionization-time is dependent upon the load, so that, at heavy overloads, the deionization-time is automatically increased, thus increasing the ability of the system to withstand the overload.

A further object of my invention is to provide a special combination of shunt-connected output-circuit capacitors and serially connected commutating-capacitors and inductive reactors, whereby operation is improved at light loads, as well as at heavy loads.

A further object of my invention is to provide an electronic frequency-converter which has high efficiency, since only one tube is in series with the current, in each output-phase.

A further object of my invention is to provide an electronic frequency-converter requiring no output-transformer.

A still further object of my invention is to provide an electronic frequency-changer system in which a double-way current is taken from each winding of the generator, thus reducing the amount of copper which is required in the generator.

Figure 2:
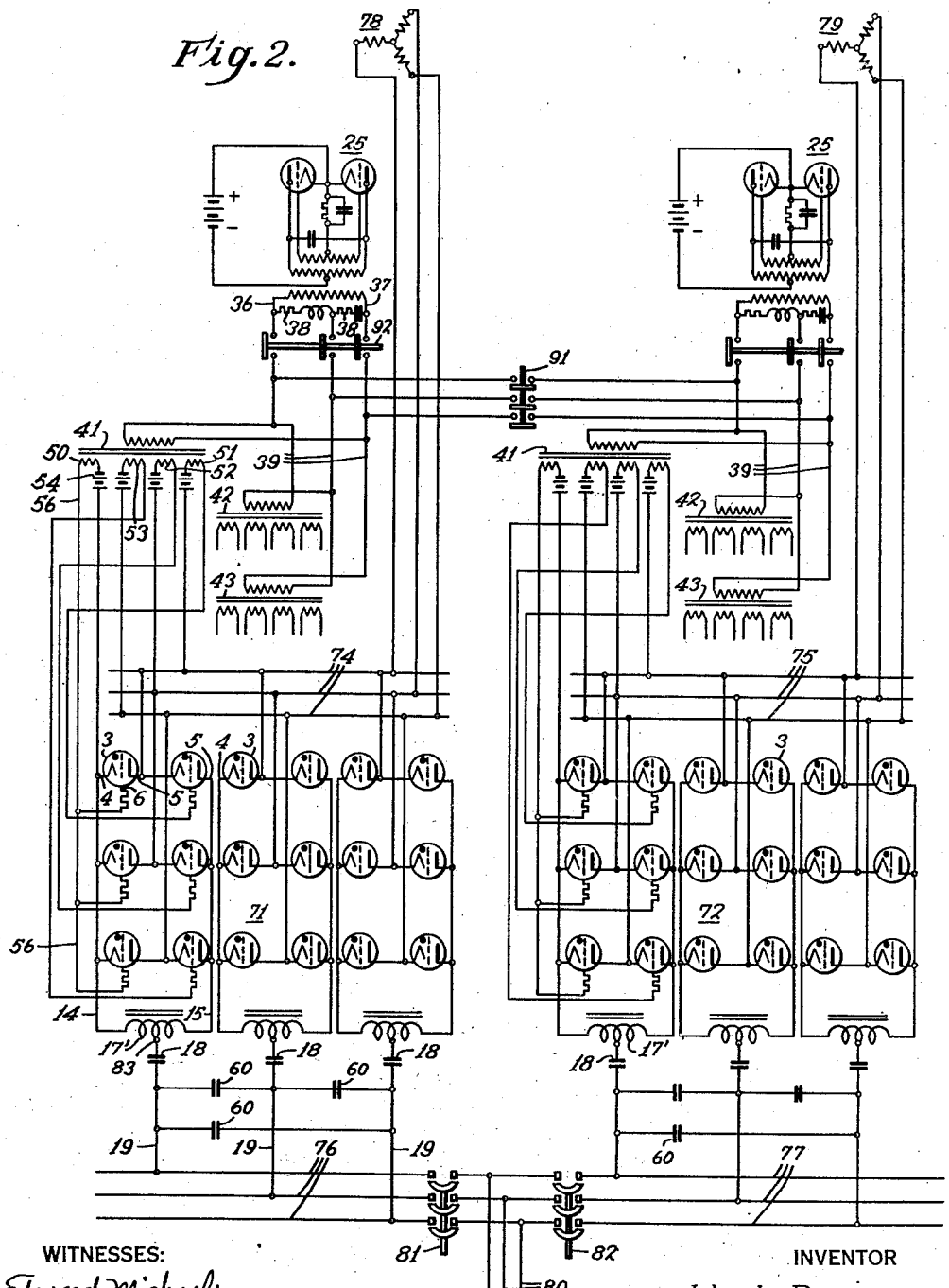

With the foregoing and other objects in view, my invention consists in the circuits, systems, combinations, apparatus, methods and parts, hereinafter described and claimed, and illustrated in the accompanying drawing, wherein the two figures are simplified diagrammatic views of circuits and apparatus illustrating my invention in two different forms of embodiments;

Fig. 1 showing the fundamental circuits for an electronic converter for changing from a three-phase input of one frequency to a three-phase output of another frequency, omitting the voltage-regulators, switching, and other controls which are not necessary to an understanding of my invention; and Fig. 2 showing two such converters, with their output-circuits and their frequency-controlling circuits each connected in parallel, and with a slight change in the serially connected reactances in the output-circuits.

Fig. 1 shows my invention embodied in the form of a three-phase electronic frequency-changer or converter for receiving power from a three-phase generator 1, of one frequency, and for delivering power to a three-phase dead-load output-circuit 2, having a frequency which is controlled independently of the generator-frequency, the load-circuit frequency being either higher or lower than the generator-frequency. The converter, as shown in Fig. 1, comprises eighteen tubes 3, each having a cathode-circuit 4, an anode-circuit 5, and a control-circuit 6. Each control-circuit 6 is provided with a serially connected grid-resistor 7 which is individual to that tube.

While my invention is applicable to converters having any kind of tube in which the main anode-cathode circuit is controlled by a grid-circuit or other control-circuit, the invention will have its most usual application in connection with tubes having a gas or vapor filling, or other means for causing the control-electrode of the tube to be ineffective, in general, to stop the firing of the tube, once the firing has been initiated, as has been symbolically indicated by the convention of a tiny circle or dot 8, which has been placed within the diagrammatic representation of each converter-tube. Each of the main power-tubes 3 of the converter may be either a hot-cathode gas-filled tube or an ignitron.

The three terminals of the generator 1 are connected, respectively, to the three phases of an input-circuit 10, which serves as a three-phase bus for energizing the converter-tubes 3. The eighteen converter-tubes 3 are arranged in pairs of tubes, connected back-to-back, that is, with the anode-circuit 5 of one tube, and the cathode-circuit 4 of the other tube, of each pair, connected together, and to one of the phases of the three-phase input-circuit 10, as indicated at 11. The cathode-circuit 4 of the first tube is connected to a cathode-circuit output-bus 14, while the anode-circuit of the second tube is connected to an anode-circuit output-bus 15.

In the form of my invention which is shown in Fig. 1, the two output-buses 14 and 15, of said pair of back-to-back energized tubes, are connected together at 16, and thence are serially connected, through an inductive reactor 17 and a serially connected commutating-capacitor 18, to an output-circuit phase-conductor 19 which is connected to one of the phases of the three-phase output-circuit or load-circuit, 2.

On the input-side of the converter, each phase of the three-phase input-circuit supplies three pairs of power-tubes 3, having their back-to-back input-circuits 11 connected to the same phase of the input-circuit, but to different phases of the output-circuit.

The three pairs of cathode and anode output-circuits 14 and 15 of the three pairs of tubes which are connected to a common input-phase, are connected, at 19, to the three different phases of the output-circuit 2, as shown. Each pair of cathode and anode output-circuits 14 and 15, which is connected to any one of the several output-phases of the output-circuit 2, is connected to the three pairs of tubes 3 which have their back-to-back input-circuits 11 connected to the three different input-phases of the input-circuit 10, as shown in Fig. 1.

The excitation-circuits or control-circuits 6 of the several main power-tubes 3 are energized from a suitable source of current having the frequency which is desired for the output-circuit 2 of the converter. For the sake of illustration, the excitation-circuit source is illustrated as comprising a single-phase two-tube oscillator 25, having a transformer having a primary winding 27, a secondary or output-winding 28, and a tertiary or feed-back winding 29. The oscillator 25 is energized from a direct-current circuit 31 which is connected between the midpoint 32 of the primary winding 27 and the common cathode-circuit 33 of the two oscillator-tubes 34 and 35.

The single-phase output-terminals 36 and 37 of the secondary winding 28 of the oscillator-transformer 25 are connected, through a phase-splitting network 38, to a three-phase control-circuit 39, which energizes the primary windings of three control-circuit transformers 41, 42 and 43, one for each of the output-phases of the output-circuit 2. Since the three-control-circuit transformers 41, 42 and 43 are identical, a description of one will suffice for all. Thus, the control-circuit transformer 41 has four secondary windings 50, 51, 52 and 53. Each of these secondary windings is connected, through a separate negative biasing-battery 54, between the cathode-circuit 4 and the grid or control-circuit 6 of its appropriate power-tube 3.

Considering the six main tubes 3, which energize the first phase of the output-circuit 2, it will be noted that three of the cathodes of these six tubes are connected together, to the cathode output-bus 14, and this common cathode-bus 14 is connected, at 55, through an individual biasing battery 54, to the right-hand terminal of the secondary winding 50. The left-hand terminal of this same secondary winding 50 is connected, at 56, to all three of the control-circuits 6 of the three main tubes 3 which have their cathodes connected to the common cathode-bus 14.

The other three tubes, of the six main tubes 3 which energize the first phase of the output-circuit 2, have three separate cathode-circuits 4, which are connected to three different input-circuit conductors 11, energized from the three different phases of the input-circuit 10, so that these three cathodes are at different potentials. Each of these three cathodes is connected, through a separate connection 57, and through a separate biasing-battery 54, to the left-hand terminal of one of the secondary windings 51, 52 and 53, respectively, and the right-hand terminals of these several secondary windings are connected to the respective control-circuits 6 of the corresponding main tube 3.

In the operation of the apparatus shown in Fig. 1, in accordance with my present invention, it will be noted that each output-phase of the electronic frequency-changer or converter consists of two groups of tubes 3, namely, the three tubes having the common cathode-bus 14, and the three tubes having the common anode-bus 15. The three tubes 3 which have the common cathode-bus 14 are controlled at the same phase-angle of the control-circuit frequency, while the three tubes 3 which are connected to the common anode-bus 15 are controlled with a control-frequency phase-angle which is displaced 180° on a control-frequency basis.

More specifically, considering the first control-circuit transformer 41 in Fig. 1, and the first pair of output-circuits 14 and 15 which are the common cathode-bus 14 and the common anode-bus 15 of the first double-group of six tubes 3, it is noted that the three tubes which are connected to the cathode-bus 14 are controlled by the secondary winding 80, from which they receive a sufficiently positive control-grid voltage for firing purposes, at one particular phase-angle during each cycle of the control-frequency voltage. Each of these three tubes then stands ready to fire, whenever its anode is more positive than its cathode, due to the respective input-voltages which are impressed upon the anodes by the supply-circuits 11 which are connected to the several input-phases of the input-circuit 10. The firing of the other three tubes 3, which are connected to the common anode-bus 15, takes place 180 electrical degrees later, on an output-frequency basis, under the control of the secondary windings 51, 52 and 53.

When a positive half-cycle of the output-frequency current first begins to flow through the common cathode-bus or output-circuit 14, of the first phase of the output-circuit 2, as a result of the firing of one of the three tubes 3 which are connected to this cathode-bus 14, the full rectified voltage of this tube is at first applied to the load-circuit conductor 19 and to the serially connected reactor 17, because the voltage-drop through the serially connected capacitor 18 is zero at the first instant of current-flow in the output-frequency cycle. When the next input-phase of the input-circuit 10 becomes more positive than the input-phase which is connected to the tube 3 which first fired, the tube corresponding to said more positive phase fires, extinguishing the previously firing tube, and taking over the burden of carrying the first half-cycle of the output-frequency current, in the first output-phase of the output-circuit 2, and in the corresponding load-circuit conductor 19.

Meanwhile, the serially connected commutating-capacitor 18 is becoming more charged, and as it becomes more charged, its voltage increases, until finally the capacitor-voltage is equal to the impressed rectifier-voltage of the cathode output-circuit 14, and this half-cycle of the output-frequency current is thus brought to zero. This explanation presupposes that a load-current is being supplied by the output-circuit 2.

At full load, each serially connected capacitor 18 cuts off the positive half-cycle of its phase of the output-current some 40 output-frequency degrees (more or less) before the firing of the negative tube-groups, that is, before the grid-circuit 6 becomes sufficiently positive, for firing purposes, in the three tubes 3 which are connected to the common anode output-circuit 15 which is paired with the cathode output-circuit 14 which has just been considered. This time-delay of 40 output-frequency degrees (more or less), during which neither the positive tube-group nor the negative tube-group is fired, in each pair of positive and negative groups, allows adequate time for the deionization of the space within the various tubes after they cease carrying current, and before any tube is again called upon to act as an insulator or open circuit-interrupter to a forward current in the tube; and this deionizing time-delay is increased when the output-current increases. Thus, in the event of a short-circuit on the output-circuit, the output-current is very heavy, resulting in charging the respective serially connectd commutating-capacitors 18 more quickly during each output-frequency half-cycle, thus increasing the deionizing time and the ability of the tubes to carry these heavy overload-currents without failure.

When the negative tube-group is firing, that is, the group of three tubes 3 which are connected to the common-anode output-circuit 15, the serially connected commutating-capacitor 18 becomes charged in the opposite direction, and the operation is repeated.

In acordance with my present invention, I make a special use of the output-circuit-reactors 17, in combination with a group of delta-connected, or parallel-connected, output-circuit capacitors 60, and also in combination with the serially connected commutating-capacitors 18.

The inductive reactors 17 cooperate with the serially connected commutating-capacitors 18 to provide a sort of tuned circuit, so as to assist in the charging and discharging of the series commutating-capacitors as previously described.

The other capacitors, or the parallel-connected capacitors 60, cooperate with the series reactors 17 to neutralize some of the output-frequency inductive reactance of the reactors 17, making it possible to utilize larger reactors; and the parallel-connected capacitors 60 also improve the wave-form of the output-voltage by reducing the ripples.

The parallel-connected capacitors 60 also supplement the action of the serially connected commutating-capacitors 18. If it were not for the parallel-connected capacitors 60, the serially connected commutating-capacitors 18 would not be operative, at no load, or at light loads, because the series commutating-capacitors 18 would not become charged sufficiently to commutate the current, or reduce it to zero, before the next positive or negative group of tubes is fired, thus resulting in both positive and negative tube-groups firing simultaneously, resulting in a short-circuit on the supply-system. The parallel-connected capacitors 60 are effective, during light loads, to draw their own charging-current, which passes through the serially connected commutating-capacitors 18, so that the latter become fully charged, say some ten degrees before the termination of each output-frequency half-cycle, even at no-load, so as to provide a ten-degree period during which neither the positive nor the negative tube-group is firing, thus avoiding a failure to commutate, at light loads.

The system which is shown in Fig. 1 is particularly useful, for example, in airplane service, in which the three-phase generator 1 may have a variable input-frequency of from 300 cycles to 900 cycles, by way of example. The output-frequency of the load-circuit 2 may be 400 cycles, for example, although I am not limited to any particular frequencies, of course.

Fig. 2 shows my invention embodied in the form of a three-phase electronic frequency-changer or converter-system, in which a plurality of converters, such as 71 and 72, have a common output-frequency. Each of the converters 71 and 72 has its own three-phase input-circuit 74 or 75, as the case may be, and its own three-phase output-circuit 76 or 77, as the case may be. The input-circuits 74 and 75 may be energized from separate three-phase generators 78 and 79, respectively, which may, or may not, have the same frequencies, and if they have the same frequencies, they may, or may not, be paralleled, no paralleling generator-connection being shown. The two three-phase output-circuits 76 and 77 are shown as being paralleled, by being connected to a common three-phase load-circuit 80, through circuit-breakers 81 and 82, respectively.

Each of the converters 71 and 72 of Fig. 2 is similar to the converter which is shown in Fig. 1, except that a different form of output-circuit reactor 17' is utilized. In Fig. 2, the output-circuit reactors 17' are mid-tapped reactors or inductors, as shown, having their terminals carried to the cathode and anode output-circuits 14 and 15, respectively, while the mid-tap 83 of each inductor is connected to the series capacitor 18, and thence to the connection 19 which leads to one of the conductors of the three-phase output-circuits 76 or 77, as the case may be.

These mid-tapped reactors 17' of Fig. 2 make it possible to operate the converter at currents and frequencies such that one group of tubes is released, or fired, before the current in the other group is zero, in each phase of the output-circuit. This is possible, because each of the reactors 17' is in the form of two mutually coupled reactors, each reactor being one-half of the mid-tapped reactor 17'. This circumstance, coupled with the reactance-neutralizing aspects of the series and shunt-connected capacitors 18 and 60, respectively, makes it possible to utilize large reactors 17', each half of which has a voltage which, under certain conditions, is high enough to commutate the output-current, even when one tube-group, of any pair of positive and negative tube-groups, is fired while the other tube-group is still carrying current. Thus, the firing of the second group of tubes, while the first group of the pair of groups is still carrying current, will produce a counter-electromotive force in the half of the reactor 17' which is in series with the previously conducting tube-group, thus causing the current in the previously conducting tube-group to go to zero whenever a larger current start to flow in the newly fired group of tubes.

In other words, if the firing of a tube in the negative group (which is connected to the common anode-bus 15, and thence to the first phase of the output-circuit 76), occurs at an instant when a tube of the positive group is still carrying current, that is, when one of the cathode-circuit-connected tubes is still carrying current, then the current in the anode-circuit 15 will become larger than the current in the cathode-circuit 14, because the anode-circuit 15 will be supplying load-current to the output circuit 76, and to the serially and shunt-connected capacitors 18 and 60, thus inducing a voltage, in the left-hand half of the reactor 17', which will make the cathode-circuit 14 more positive than the impressed anode-voltage of the supply-conductor 11, in the tube which was previously carrying current, thus extinguishing that tube.

Each of the converters 71 and 72 of Fig. 2 preferably has its own complete control-equipment, which may be similar to that which has already been described in connection with Fig. 1. To avoid confusion in the drawing, the complete control-circuit connections for the second and third control-circuit transformers 42 and 43, of each converter, have been omitted, in Fig. 2, with the understanding that these connections apply to the tubes which are connected to the second and third output-phases, as shown in Fig. 1.

In accordance with a control-circuit invention which is covered by my concurrently filed application, Serial No. 716,194, the three-phase control-frequency circuit 39 of the converter 71 is joined to the corresponding circuit of the converter 72 by a three-pole contactor 91; and a damaged oscillator 25 can be disconnected by a three-pole contactor 92.

The effect of the output-frequency control-circuit interconnection 91 is to assure a positive or "infinite bus" source of control-frequency voltage, which is common to the two converters 71 and 72, and which does not substantially vary, in voltage, because of the control-circuit currents which are drawn by the control-circuits of the respective converters 71 and 72. This control-circuit bus-connection 91 is operative, of course, regardless of the relative phases or frequencies of the two input-circuits 74 and 75. Because of this control-circuit interconnection 91, it is possible to parallel the two output-circuits 76 and 77, by closing the breakers 81 and 82, thus supplying a load-circuit 80 which might normally be energized from both generators 78 and 79, paralleled through their respective converters 71 and 72, or, in the event of the failure of either generator or either converter, or under light-load conditions, the load-circuit 80 might be energized from either generator alone, by opening the other circuit-breaker 81 or 82, as the case may be.

While I have described my invention in connection with two specific illustrative forms of embodiment thereof, I wish it to be understood that my invention is not limited to these particular applications, and that many changes of substitution, omission or addition may be made, without departing from the essential spirit of the invention. I desire, therefore, that the appended claims shall be accorded the broadest construction consistent with their language.

I claim as my invention:

1. In combination, means for providing an input-circuit, means for providing an alternating-current output-circuit, and a multi-tube electronic converter between said circuits, said converter including main-circuit connections for connecting each conductor of the input-circuit to a plurality of pairs of tubes disposed back-to-back, control-circuit means for controlling the several tubes at the output-frequency, and output-circuit connections for connecting each conductor of the output-circit to two groups of tubes for supplying opposite polarities of the output-frequency current, said output-circuit connections serially including a commutating-capacitor for each output-circuit conductor; each commutating-capacitor being traversed alternately by opposite polarities of the output-current in its associated output-circuit conductor, and having sufficient capacitance to interrupt each half-cycle of current in its output-circuit conductor considerably before the time for the beginning of the succeeding half-cycle, at the rated output of the converter.

2. In combination, means for providing an input-circuit, means for providing an alternating-current output-circuit, and a multi-tube electronic converter between said circuits, said converter including main-circuit connections for connecting each conductor of the input-circuit to a plurality of pairs of tubes disposed back-to-back, control-circuit means for controlling the several tubes at the output-frequency, and output-circuit connections for connecting each conductor of the output-circuit to two groups of tubes for supplying opposite polarities of the output-frequency current, said output-circuit connections serially including an inductive reactor and a commutating-capacitor for each output-circuit conductor; each commutating-capacitor being traversed alternately by opposite polarities of the output-current in its associated output-circuit conductor, and having sufficient capacitance to intercept each half-cycle of current in its output-circuit conductor considerably before the time for the beginning of the succeeding half-cycle, at the rated output of the converter; the inductive reactor being partially tuned to the commutating-capacitor to contribute to this effect.

3. In combination, means for providing an input-circuit, means for providing an alternating-current output-circuit, and a multi-tube electronic converter between said circuits, said converter including main-circuit connections for connecting each conductor of the input-circuit to a plurality of pairs of tubes disposed back-to-back, control-circuit means for controlling the several tubes at the output-frequency, and output-circuit connections for connecting each conductor of the output-circuit to two groups of tubes for supplying opposite polarities of the output-frequency current, said output-circuit connections serially including an inductive reactor and a commutating-capacitor for each output-circuit conductor, and a parallel-connected output-circuit capacitor or capacitors; each serially connected commutating capacitor being traversed alternately by opposite polarities of the output-current in its associated output-circuit conductor, and having sufficient capacitance to interrupt each half-cycle of current in its output-circuit conductor considerably before the time for the beginning of the succeeding half-cycle, at the rated output of the converter; said parallel-connected output-circuit capacitor or capacitors having such capacitance as to charge the serially connected commutating-capacitors to current-interrupting value slightly before the time for the beginning of the succeeding half-cycle under no-load conditions on the output-circuit.

4. In combination, means for providing an input-circuit, means for providing an alternating-current output circuit, and a multi-tube electronic converter between said circuits, said converter including main-circuit connections for connecting each conductor of the input-circuit to a plurality of pairs of tubes disposed back-to-back, control-circuit means for controlling the several tubes at the output-frequency, output-circuit positive and negative half-wave current-connections for grouping the converter-tubes in a pair of positive and negative tube-groups for each output-circuit conductor, a mid-tapped inductive reactor having its terminals connected to the output-circuit positive and negative half-wave current-connections of each pair of tube-groups, and a commutating-capacitor serially connected between the mid-tap of each reactor and the associated output-circuit conductor; each commutating-capacitor having sufficient capacitance to interrupt each half-cycle of current in its output-circuit conductor considerably before the time for the beginning of the succeeding half-cycle, at the rated output of the converter; and each mid-tapped inductive reactor having sufficient terminal-to-terminal reactance to limit the internal short-circuit current of the converter, in the event of the failure of one converter-tube, to a value which can be commutated by an unfaulted converter-tube, and also having sufficient terminal-to-midtap voltage, under favorable conditions, to commutate the output-current.

5. In combination, means for providing an input-circuit, means for providing an alternating-current output-circuit, and a multi-tube electronic converter between said circuits, said converter including main-circuit connections for connecting each conductor of the input-circuit to a plurality of pairs of tubes disposed back-to-back, control-circuit means for controlling the several tubes at the output-frequency, output-circuit positive and negative half-wave current-connections for grouping the converter-tubes in a pair of positive and negative tube-groups for each output-circuit conductor, a mid-tapped inductive reactor having its terminals connected to the output-circuit positive and negative half-wave current-connections of each pair of tube-groups, a commutating-capacitor serially connected between the mid-tap of each reactor and the associated output-circuit conductor, each commutating-capacitor having sufficient capacitance to interrupt each half-cycle of current in its output-circuit conductor considerably before the time for the beginning of the succeeding half-cycle, at the rated output of the converter, each mid-tapped inductive reactor having sufficient terminal-to-terminal reactance to limit the internal short-circuit current of the converter, in the event of the failure of one converter-tube, to a value which can be commutated by an unfaulted converter-tube, and also having sufficient terminal-to-midtap voltage, under favorable conditions, to commutate the output-current, and a parallel-connected output-circuit capacitor or capacitors having such capacitance as to charge the commutating-capacitors to current-interrupting value slightly before the time for the beginning of the succeeding half-cycle under no-load conditions on the output-circuit.

JOHN L. BOYER.